US 6,582,119 B2

(12) United States Patent
Mori et al.

(10) Patent No.: US 6,582,119 B2
(45) Date of Patent: Jun. 24, 2003

(54) WIRE BREAKING DETECTION METHOD FOR TEMPERATURE SENSOR AND TEMPERATURE SENSING APPARATUS FOR USING THE METHOD

(75) Inventors: Yutaka Mori, Toyohashi (JP); Yukihiko Kanayama, Toyokawa (JP); Fukami Imai, Kariya (JP); Yoshiyuki Shibata, Toyota (JP); Susumu Koike, Okazaki (JP); Yasushi Yamada, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 09/803,896

(22) Filed: Mar. 13, 2001

(65) Prior Publication Data

US 2001/0038661 A1 Nov. 8, 2001

(30) Foreign Application Priority Data

Mar. 13, 2000 (JP) ......................... 2000-067916

(51) Int. Cl.$^7$ .......................... G01K 13/00; G01K 1/14; G01K 7/16; G01N 25/00
(52) U.S. Cl. .................... 374/45; 374/183; 374/141; 324/721; 702/58
(58) Field of Search .................. 374/45, 183, 141, 374/48; 702/58–59, 64–65, 117–118, 130, 132–133, 136, 177–178, 183–185, 188–189, FOR 103–106, FOR 132, FOR 170–171; 327/512, 513; 324/721, 691, 703, 713, 727

(56) References Cited

U.S. PATENT DOCUMENTS 3,882,481 A * 5/1975 Turner .................. 340/336
3,927,571 A * 12/1975 Athey .................... 374/183

(List continued on next page.)

FOREIGN PATENT DOCUMENTS

| EP | 0 903 279 | | 3/1999 | |
| GB | 1171918 | * | 11/1969 | ............... 374/45 |
| JP | 56033712 A | * | 4/1981 | ............. 236/21 R |

(List continued on next page.)

*Primary Examiner*—Diego Gutierrez
*Assistant Examiner*—Gail Verbitsky
(74) *Attorney, Agent, or Firm*—Oblon, Spivak, McClelland, Maier & Neustadt, P.C.

(57) ABSTRACT

A temperature sensing apparatus comprises a temperature sensor, a current measuring device and temperature detection circuit. The temperature sensor contains a thermal resistor that is disposed near a motor and outputs voltages acting to the thermal resistor. The current measuring device measures quantity of current that is applied to the motor. The temperature detection circuit detects temperature of the motor according to the output voltages from the temperature sensor. And, the temperature detection circuit judges whether a predetermined quantity of current is applied to the motor during a predetermined time. When the predetermined quantity of current is applied to the motor during the predetermined time, the temperature detection circuit compares a temperature detected by the current measuring device with a predetermined temperature. When the detected temperature is lower than the predetermined temperature, the temperature detection circuit decides a wire of the thermal resistor breaks.

16 Claims, 6 Drawing Sheets

U.S. PATENT DOCUMENTS

| | | | | |
|---|---|---|---|---|
| 4,083,001 A | * | 4/1978 | Paice | 324/158 MG |
| 4,115,785 A | * | 9/1978 | Hoopes et al. | 346/34 |
| 4,446,421 A | * | 5/1984 | Berde | 324/52 |
| 4,463,249 A | * | 7/1984 | Narita et al. | 219/441 |
| 4,474,825 A | * | 10/1984 | Schmidt | 427/10 |
| 4,894,518 A | * | 1/1990 | Ishikawa et al. | 219/413 |
| 5,158,366 A | * | 10/1992 | Nagai et al. | 374/183 |
| 5,373,141 A | * | 12/1994 | Ko | 219/497 |
| 5,700,089 A | * | 12/1997 | McKinnon | 374/142 |
| 5,959,537 A | * | 9/1999 | Banting et al. | 340/664 |
| 6,161,958 A | * | 12/2000 | Rattman et al. | 374/1 |
| 6,170,241 B1 | * | 1/2001 | Shibilski et al. | 56/11.9 |
| 6,210,036 B1 | * | 4/2001 | Eberle et al. | 374/141 |
| 6,343,259 B1 | * | 1/2002 | Sedlak et al. | 702/58 |
| 6,356,138 B1 | * | 3/2002 | Ohshima | 327/434 |

FOREIGN PATENT DOCUMENTS

| | | | | | |
|---|---|---|---|---|---|
| JP | 0208428 | * | 12/1982 | | 374/45 |
| JP | 0038470 | * | 2/1986 | | 374/45 |
| JP | 0184431 | * | 8/1986 | | 374/183 |
| JP | 61-184431 | | 8/1986 | | |
| JP | 63-240467 | | 10/1988 | | |
| JP | 0243949 | * | 9/1990 | | 374/45 |
| JP | 3-31731 | | 2/1991 | | |
| JP | 03113383 A | * | 5/1991 | | 324/522 |
| JP | 403140829 A | * | 6/1991 | | 374/163 |
| JP | 04062439 | * | 2/1992 | | 374/163 |
| JP | 4-333883 | | 11/1992 | | |
| JP | 404333882 | * | 11/1992 | | 374/45 |
| JP | 404333883 | * | 11/1992 | | 374/45 |
| JP | 6-242699 | | 9/1994 | | |
| JP | 6-243362 | | 9/1994 | | |
| JP | 09021527 A | * | 1/1997 | | F23D/14/00 |
| JP | 11-3123 | | 1/1999 | | |
| JP | 02001153726 A | * | 6/2001 | | G01J/5/02 |
| SU | 1047747 | * | 10/1983 | | B60M/3/04 |
| SU | 1599758 | * | 10/1990 | | 374/45 |
| WO | WO 99/53280 | | 10/1999 | | |

* cited by examiner

WIRE BREAKING DETECTION METHOD FOR TEMPERATURE SENSOR AND TEMPERATURE SENSING APPARATUS FOR USING THE METHOD

INCORPORATION BY REFERENCE

The disclosure of Japanese Patent Application No. 2000-67916 filed on Mar. 13, 2000 is incorporated herein by reference in its entirety.

BACKGROUND OF THE INVENTION

1. Field of the Invention

This invention relates to a wire breaking detection method for a temperature sensor and a temperature sensing apparatus for using the method.

2. Description of the Related Art

In an electric power steering apparatus for an automobile, steering operation is assisted by driving a motor according to steering torque that is measured by a torque sensor. When the motor outputs continuously a large amount of power, temperature of the motor turns up. It causes deterioration of performance of the motor. To avoid the deterioration of the motor, when high temperature is sensed by a temperature sensor attached to the motor, a warning signal such as a lamp is turned on. A temperature sensor consisted with a thermal resistor (hereinafter "thermistor") and a pull-up resistor is generally known as above described temperature sensor. In this temperature sensor, variations of resistance of the thermistor are measured as variations of voltage, and the temperature can be determined by the variations of voltage. The pull-up resistor that has dozens kΩ resistances is connected series with the thermistor, and voltages, for example five volts, are applied to them. Then the temperature can be determined by measuring voltages that acts to the thermistor.

Since the thermistor is weak in vibrations, when the temperature sensor is attached on the automobile, it is possible that a wire breaking of the thermistor happens by vibrations of the automobile.

In a case of the temperature sensor is adapted for the motor of the electric power steering apparatus, since a temperature range of an operating area for the motor is wide such as from −40° C. (in a case of using the automobile in a cold district) to 100° C. (highest temperature of permissible tolerance limits for using of the motor), resistance of the thermistor varies widely such as from several MΩ (−40° C.) to dozens kΩ (100° C.). In low temperature, resistance of the thermistor becomes very high quantity such as several MΩ. Therefore, from the amount of measuring voltage only, it can not be distinguished a wire breaking of the thermistor from high value of resistance caused by low temperature. For example, when five volts voltages are applied to the thermistor and the pull-up resistor having dozens kΩ resistances, since measured voltages that acts to the thermistor are approximately five volts in both case of the thermistor having several MΩ resistances by low temperature such as −40° C. and having infinity resistance by a wire breaking of the thermistor, it can not be distinguished a wire breaking of the thermistor from low temperature.

SUMMARY OF THE INVENTION

In view of the foregoing, an object of the present invention is to provide a wire breaking detection method for a temperature sensor and a temperature sensing apparatus for using the method, which can detect a wire breaking even in low temperature.

In order to achieve the above object, the present invention provides the wire breaking detection method for a temperature sensor that measures temperature of an electric driven device according to a variation of a resistance thereof. In this method, whether a predetermined quantity of current is applied to the electric driven device during a predetermined time is judged. When the predetermined quantity of current is applied to the electric driven device during the predetermined time, a measured temperature, which is measured by the temperature sensor, is comparing with a predetermined temperature. And, when the measured temperature is lower than the predetermined temperature, it is decided that a wire of the temperature sensor breaks.

In order to achieve the above object, the present invention provides the temperature sensing apparatus for measuring temperature of an electric driven device. The temperature sensing apparatus comprises a temperature sensor, a current measuring device and a temperature detection circuit. The temperature sensor outputs equivalents of resistance of a thermal resistor that is contained therein and disposed near the electric driven device. The current measuring device measures quantity of current that is applied to the electric driven device. The temperature detection circuit detects temperature of the electric driven device according to the output equivalents from the temperature sensor. And, the temperature detection circuit judges whether a predetermined quantity of current is applied to the electric driven device during a predetermined time according to quantity of current measured by the current measuring device. When the predetermined quantity of current is applied to the electric driven device during the predetermined time, the temperature detection circuit compares a temperature detected by the current measuring detection circuit with a predetermined temperature. When the detected temperature is lower than the predetermined temperature, the temperature detection circuit decides a wire of the thermal resistor breaks.

According to the present invention, the wire breaking is detected by comparing the measured temperature with the predetermined temperature when the predetermined quantity of current is applied to the electric driven device during the predetermined time. Therefore, the wire breaking can be detected even in low temperature.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which.

DESCRIPTION OF THE PREFERRED EMBODIMENTS

Embodiments of the present invention will be described with reference to the drawings.

Figure 1:
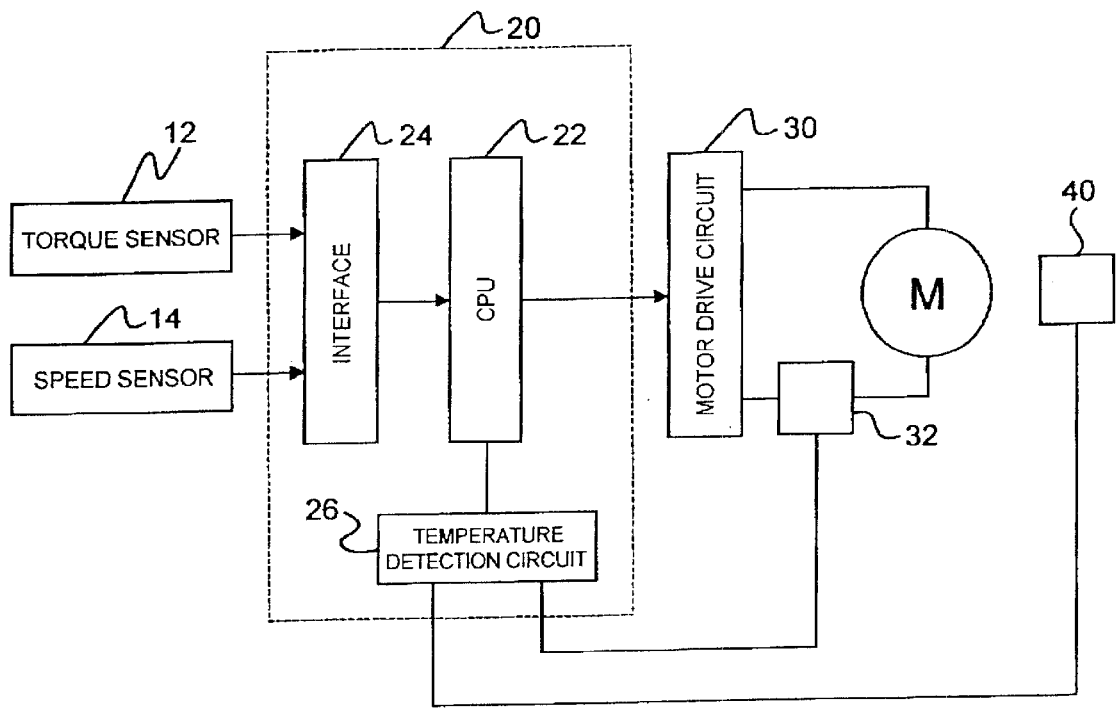
FIG. 1 is a block diagram of a control device for an electric power steering apparatus according to an embodiment of the invention.

In FIG. 1, an electric power steering apparatus for an automobile is comprising a torque sensor 12 for measuring steering torque, a speed sensor 14 for measuring speed of the automobile, a control device 20 for calculating order torque (assist torque) to a motor M according to steering torque measured by the steering sensor 12 and speed of automobile measured by the speed sensor 14, and a motor drive circuit 30 for controlling the motor M according to the order torque. The torque sensor 12 measures steering torque as torsion quantity of a torsion bar (not shown) that connects an input shaft joined a handle of the automobile and an output shaft joined a steering mechanism. The control device 20 is consisted with a CPU 22, an interface 24 for connecting the CPU 22 with the torque sensor 12 and the speed sensor 14, and a temperature detection circuit 26 for detecting temperature of the motor M. Further, a current measuring device 32 for measuring quantity of current that is applied to the motor M is connected between the motor drive circuit 30 and the motor M. For outputting measured current quantity to the temperature detection circuit 26, the current measuring device 32 is connected to the temperature detection circuit 26, too. A temperature sensor 40 for measuring temperature of the motor M is disposed near the motor M.

Figure 2:
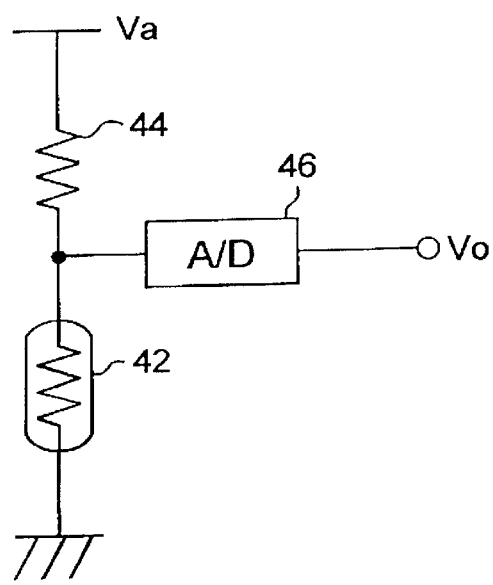
FIG. 2 is a block diagram of a temperature sensor according to the embodiment.

In FIG. 2, the temperature sensor 40 is consisted with a thermistor 42, a pull-up resistor 44 that has dozens kΩ resistance and an analog-to-digital converter 46. Voltage Va (in this embodiment, five volts) is applied to the thermistor 42 and the pull-up resistor 44 connected in series. Then, the analog-to-digital converter converts analog voltage, which is acting the thermistor 42, to digital value Vo and outputs it to the temperature detection circuit 26.

Figure 3:
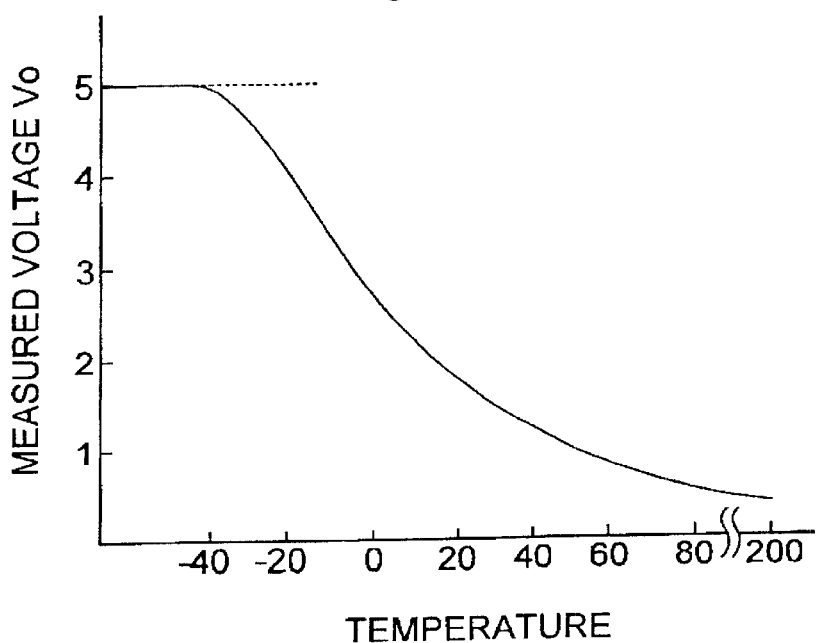
FIG. 3 is a graph showing measured voltage of the temperature sensor compared with temperature.

In this embodiment, since the temperature sensor 40 can measure the temperature of the motor M in a condition that temperature of the motor M varies between −40° C. (in a case of using the automobile in a cold district) to 200° C. (highest temperature of permissible tolerance limits for using of the motor), resistance of the thermistor 42 becomes several MΩ when temperature is −40° C. and becomes dozens kΩ when temperature is 200° C. Therefore, when five volts voltages are applied to the pull-up resistor 44 that has dozens kΩ resistance and thermistor 42, referring FIG. 3, measured voltages Vo become approximately five volts when temperature is −40° C. and become hundreds mV when temperature is 200° C. Since the temperature detection circuit 26 calculates a temperature according to the measured voltages Vo and outputs it to the CPU 22, the temperature sensor 40 outputs approximately five volts as measured voltages Vo to the temperature detection circuit 26 when the temperature of the motor M is −40° C. Meanwhile, when a wire of the thermistor 42 breaks, since resistance of the thermistor 42 becomes infinity, the temperature sensor 40 outputs approximately five volts to the temperature detection circuit 26. Therefore, the temperature detection circuit 26 can not distinguish the wire breaking with low temperature such as −40° C. according to only measured voltages Vo. On this account, the temperature detection circuit 26 features a wire breaking detection algorithm in this embodiment, and the control device 20 contains to output a warning signal that is output when a wire breaking is detected by the wire braking detection algorithm.

As the wire breaking detection algorithm at the temperature detection circuit 26, two kinds of algorithm will be described with reference FIGS. 4, 5a, 5b, 6a and 6b. In these algorithms, when current of a predetermined quantity is continuously applied to the motor M during a predetermined time, which means temperature of the motor M rises some quantity, the wire breaking of the thermistor 42 is detected according to whether the rose quantity of temperature can be or not measured correctly by the temperature sensor 40. That is, the measured temperature is compared with a predetermined temperature, when the measured temperature is lower than the predetermined temperature, it is decided that the wire of the thermistor breaks.

Figure 4:
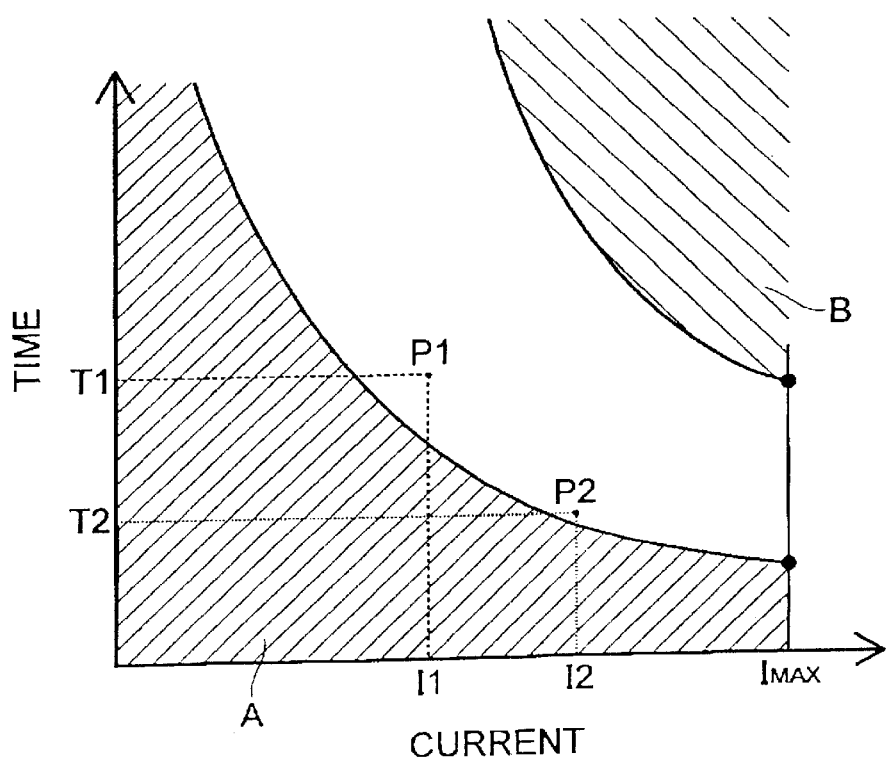
FIG. 4 is a graph showing applied time compared with applied current to a motor according to the embodiment.

Above described predetermined quantity of current and predetermined time are detailed referring FIG. 4. In FIG. 4, an axis of abscissa indicates current quantity applied to the motor M, and an axis of ordinate indicates time of current applied to the motor M. A hatching portion indicated A means an area which temperature does not rise to a level, which rose temperature can detect, when the motor M is driven in low temperature condition such as −40° C. On the other hand, another hatching portion indicated B means high temperature area which deterioration of performance of the motor M happens. The predetermined current quantity and time are set up in an area without the hatching portion A and the hatching portion B. The temperature detection circuit 26 can detect the wire breaking even extremely low temperature to setting up the predetermined current quantity and the predetermined time above the hatching portion A. On the other hand, the temperature detection circuit 26 can detect the wire breaking before performance of the motor M deteriorates to setting up the predetermined current quantity and the predetermined time below the hatching portion B. Further, two pairs of the predetermined current quantity and time P1, P2 are set up. For example, 120 seconds (T1) and 35A (I1) are set up as first pair P1 of predetermined current quantity and time, and 60 second (T2) and 45A (I2) are set up as second pair P2 of the same. When current applied to the motor M satisfies at least one of the pairs of predetermined current quantity and time, the temperature detection circuit 26 compares the temperature measured by the temperature sensor 40 with the predetermined temperature (for example 25° C.). If the temperature measured by the temperature sensor 40 is lower than the predetermined temperature, the temperature detection circuit 26 decides that the wire of the thermistor 42 breaks. Therefore, even in a condition that current applied time to the motor M is shorter than the first predetermined time T1 (120 seconds), for example 70 seconds, the wire breaking can be detected by comparing with the second pair of predetermined current quantity and time P2. And even in another condition that current quantity applied to the motor M is less than the second predetermined current quantity I2 (45A), for example 40A, the wire breaking can be detected by comparing the first pair of predetermined current quantity and time P1. Now, two pairs of predetermined current quantity and time are set up in this embodiment, however it is possible that one or more than three pairs of the same are set up.

Figure 5:
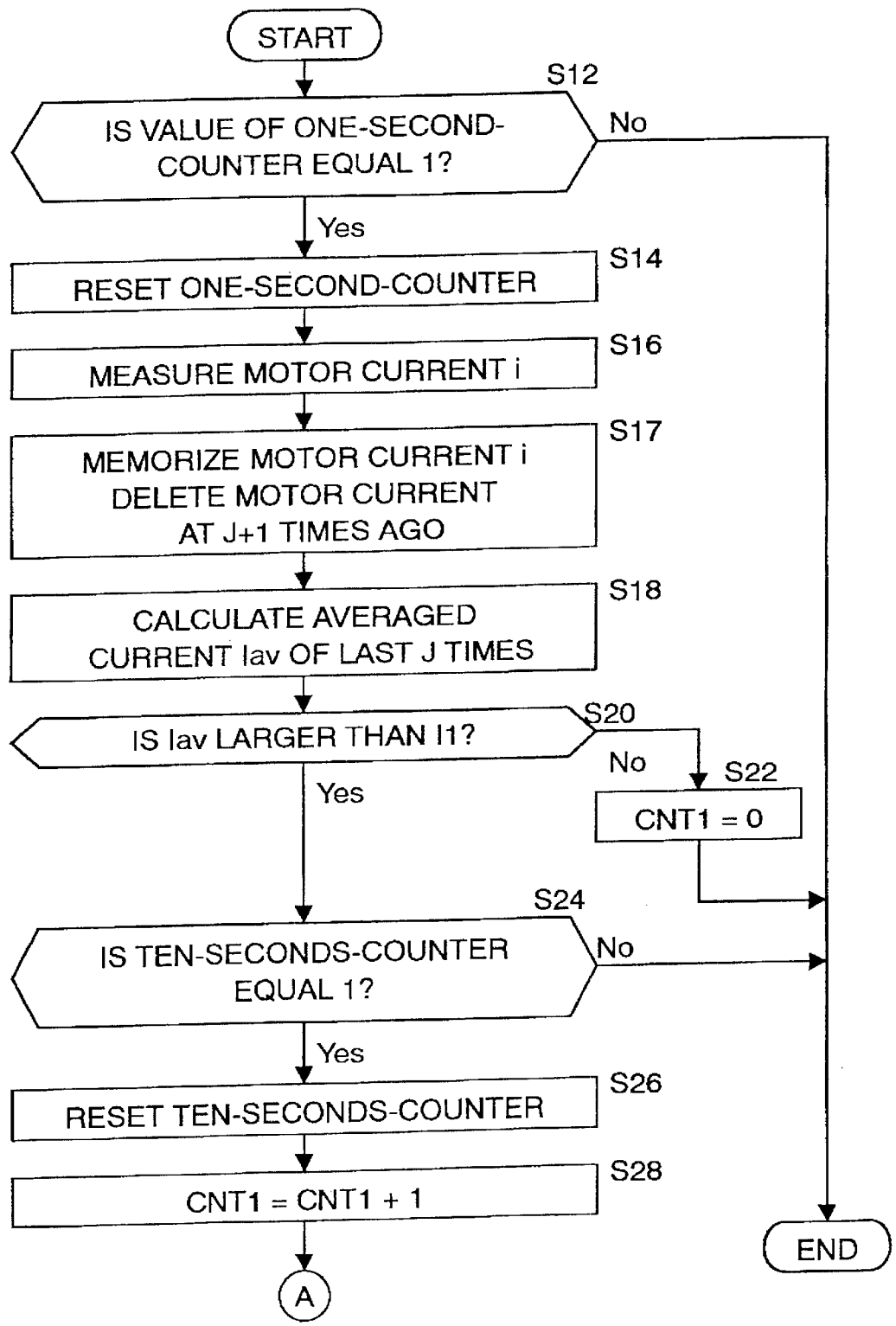
FIG. 5a is a part of flowchart showing a first algorithm for a wire breaking detection according to the embodiment.
FIG. 5b is another part of flowchart showing the first algorithm for the wire breaking detection according to the embodiment.
Figure 5:
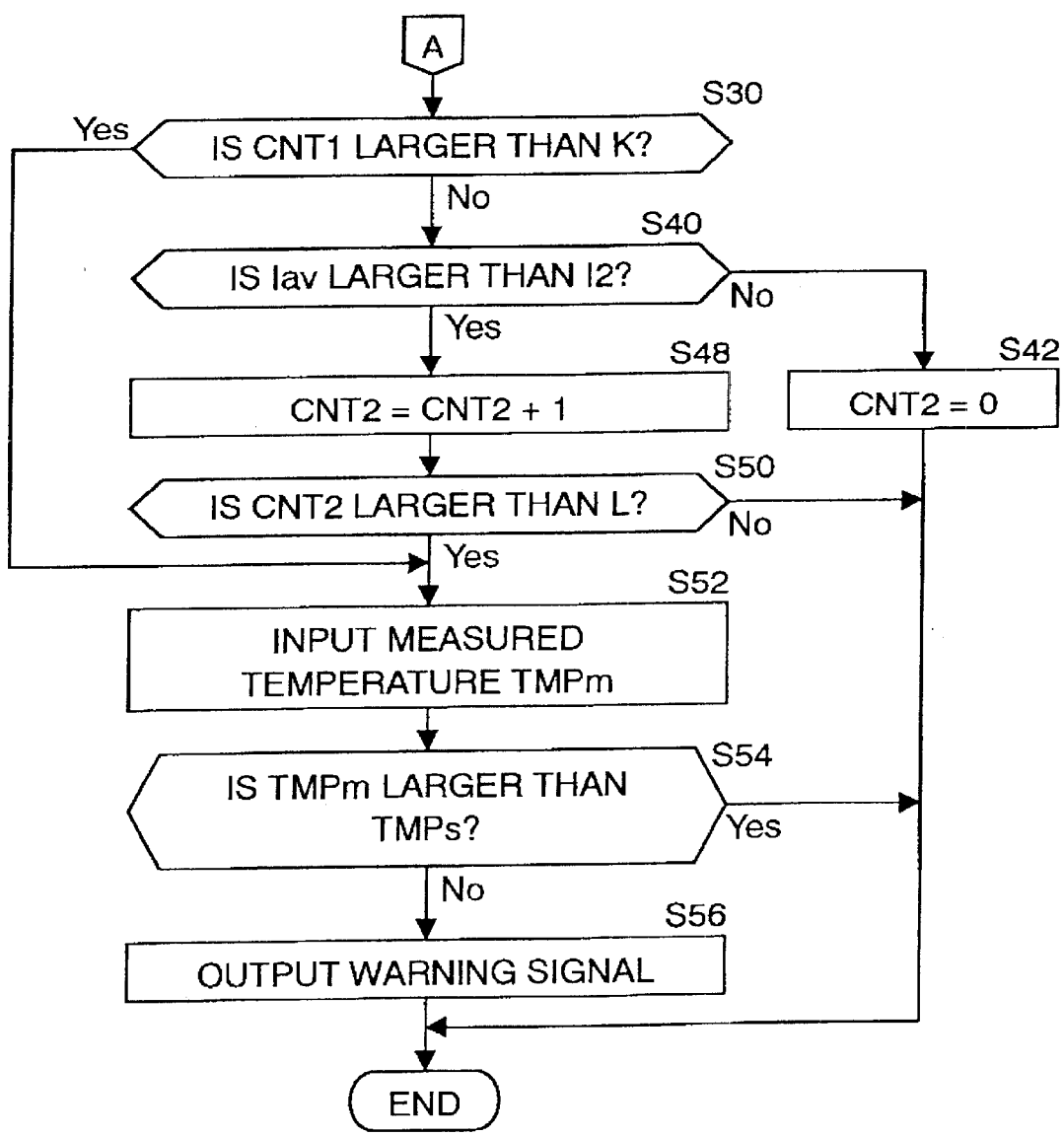

A first wire breaking detection algorithm at the temperature detection circuit 26 will describe concretely with a flowchart showing FIGS. 5a and 5b. First, it is judged that a value of a one-second-counter, which outputs "one" when one second pass, is or not one in step 12. When a judgement in step 12 is "No," namely the value of the one-secondcounter is not equal one, the process is finished. On the other hand, when the judgement in step 12 is "Yes," namely the value of the one-second-counter is equal one, the process is forwarded to step 14 and the one-second-counter is reset. These processes mean that below steps are proceeded at every one second.

Next, current quantity i applied to the motor M is measured by the current measuring device 32 in step 16. A measured current quantity i is memorized to the temperature detection circuit 26, and a current quantity measured at J+1 times ago (in this embodiment, J is equal 10) and memorizing to the temperature detection circuit 26 is deleted in step 17. This means the temperature detection circuit 26 memorizes current quantities measured during last J (=10) seconds. And an averaged current quantity Iav, which is an average of current quantities measured at last J (=10) times, is calculated in step 18. The averaged current quantity Iav is compared with above described first predetermined current quantity I1. That is, it is judged that the average of current quantity Iav during last ten seconds is or not larger than I1 (=35A) in step 20. When a judgement in step 20 is "No," namely the averaged current quantity Iav is equal or smaller then I1 (=35A), a first counter CNT1 is reset in step 22 and the process is finished. It is understood that the first counter CNT1 measures current applied time, which is larger than I1 (=35A). On the other hand, when the judgement in step 20 is "Yes," namely the average current quantity Iav is larger than I1 (=35A), it is judged that a value of a ten-second-counter, which outputs "one" when ten seconds pass, is or not one in step 24. When a judgment in step 24 is "No," namely the value of the ten-seconds-counter is not equal one, the process is finished. When the judgement in step 24 is "Yes," namely the value of the ten-seconds-counter is equal one, the process is forwarded to step 26 and the ten-seconds-counter is reset. These processes mean that below steps are proceeded at every ten seconds.

Consecutively, the value of the first counter CNT1 is increased only one in step 28, and it is judged that the value of the first counter CNT1 is larger than K in step 30 (in this embodiment, K is equal 11). This means to judge passing or not 120 seconds. When a judgement in step 30 is "Yes," namely K is larger than 11, which means 120 seconds passed, a temperature TMPm of the motor M, which is measured by the temperature sensor 40, is input to the temperature detection circuit 26 in step 52. And it is judged that the input temperature TMPm is or not higher than a predetermined temperature TMPs (for example 25° C.) in step 54. When a judgement in step 54 is "No," namely input temperature TMPm is equal or lower than the predetermined temperature TMPs, it is decided that the wire of the thermistor 42 breaks. And a warning lamp (not shown) is turned on in step 56, and urges a driver to drive carefully and to repair immediately. When the judgement in step 54 is "Yes," namely input temperature TMPm is higher than the predetermined temperature TMPs, it is decided that the temperature sensor 40 is working normally and the process is finished.

Meanwhile, when the judgement in above described step 30 in "No," namely current larger than I1 (=35A) is not applied to the motor M continuously 120 seconds, the averaged current quantity Iav is compared with above described second predetermined current quantity I2 (=45A) in step 40. When a judgement in step 40 in "No," namely the averaged current quantity Iav is equal or smaller than I2 (=45A), a second counter CNT2 is reset in step 42 and the process is finished. It is understood that the second counter CNT2 measures current applied time, which is more than I2 (=45A). On the other hand, when the judgement in step 40 is "Yes," namely the averaged current quantity Iav is larger than I2 (=45A), the value of the second counter CNT2 is increased only one in step 48. And it is judged that the value of the second counter CNT2 is larger than L (in this embodiment, L is equal five) in step 50. This means to judge passing or not 60 seconds. When a judgement in step 50 is "Yes," namely L is larger than five, the temperature TMPm of the motor M that is measured by the temperature sensor 40 is input to the temperature detection circuit 26 in step 52. And it is judged that input temperature TMPm is or not higher than the predetermined temperature TMPs in step 54. When input temperature TMPm is equal or smaller than the predetermined temperature TMPs, it is decided that the wire of the thermistor 42 breaks and the warning lamp is turned on.

Besides, in above described embodiments, the warning lamp is turned on when the wire breaking is detected, however it is possible to decrease the maximum current applied to the motor M in addition to or instead of the turning on the lamp.

Figure 6A:
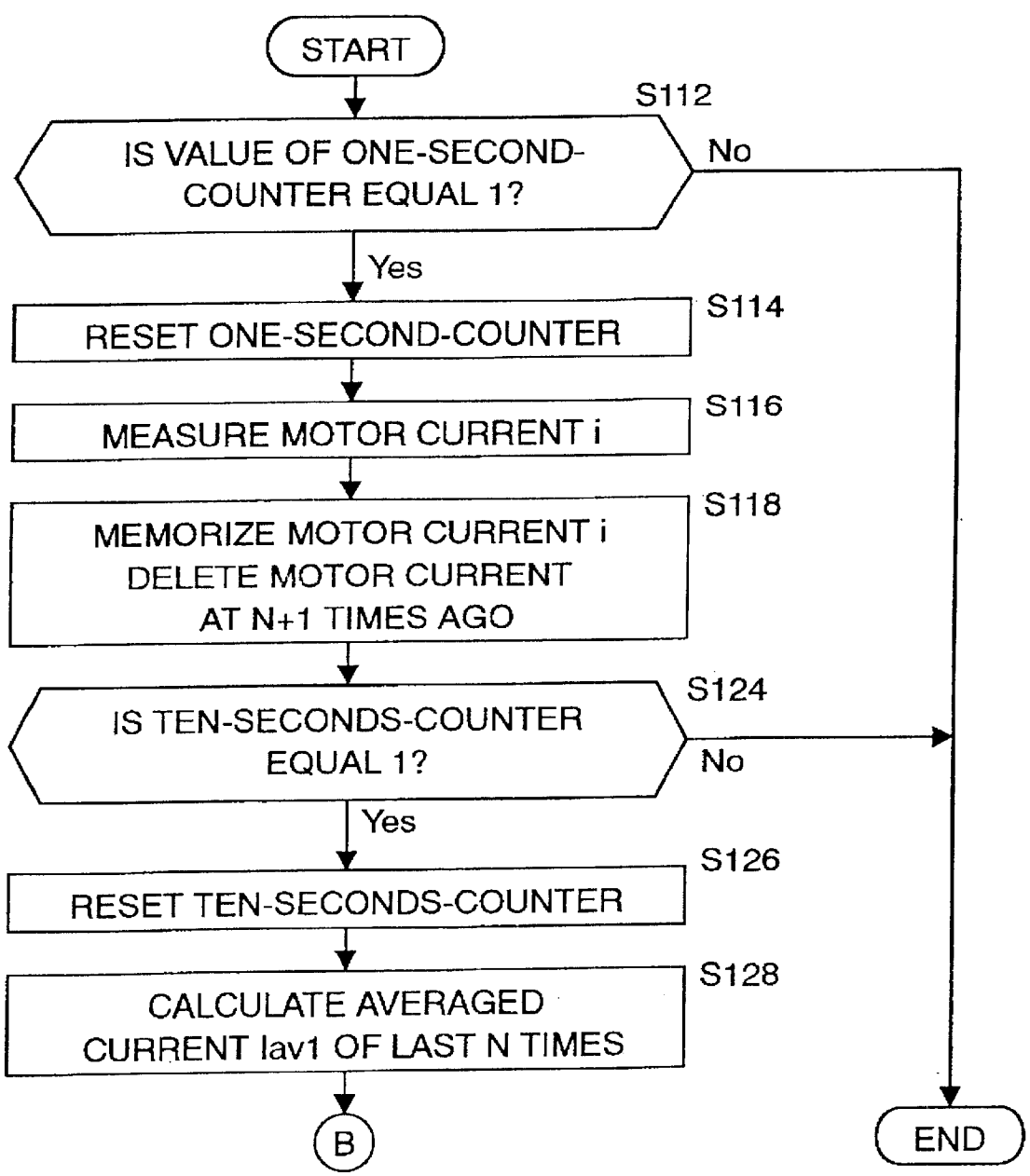
FIG. 6a is a flowchart showing a second algorithm for the wire breaking detection according to the embodiment.
Figure 6:
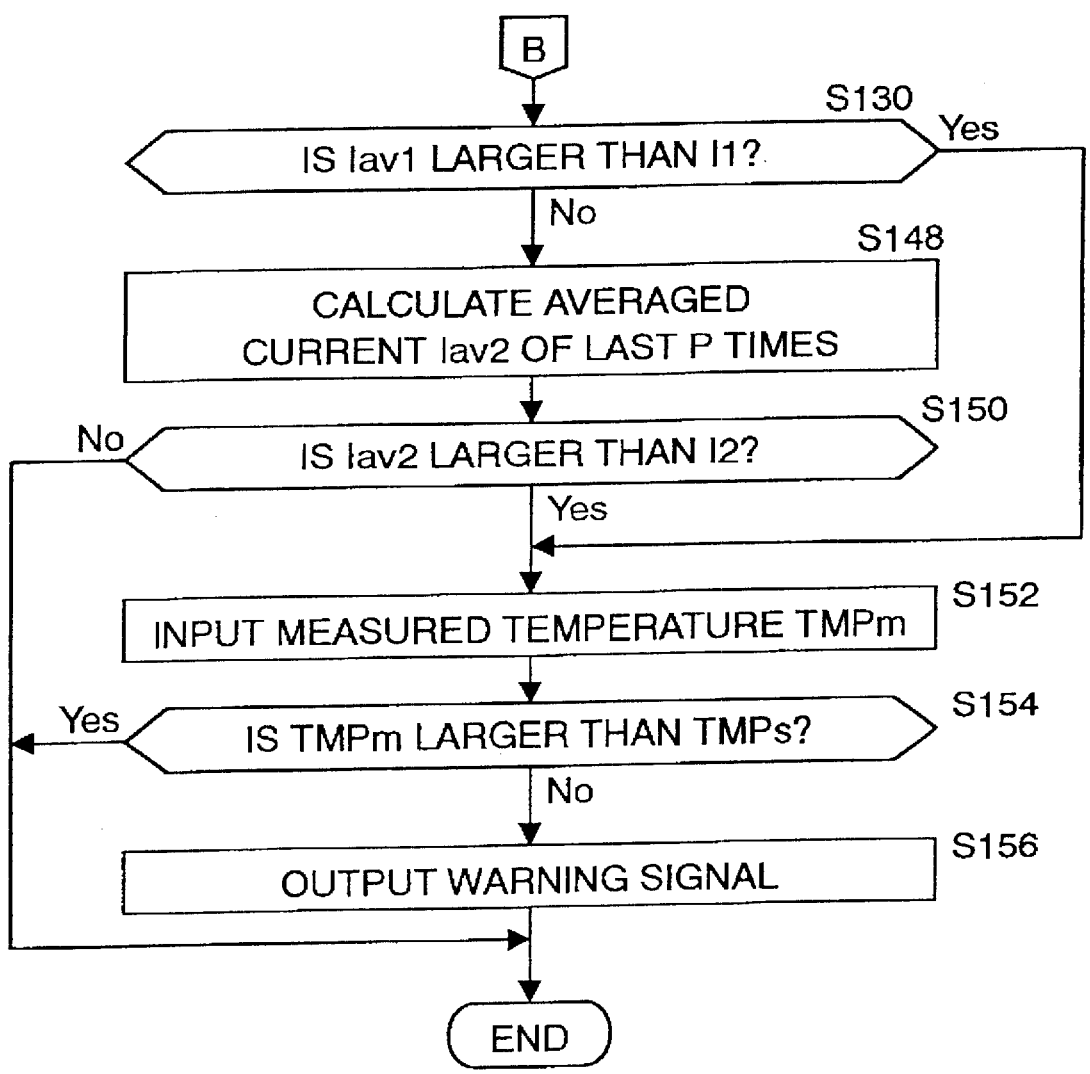
FIG. 6b is another part of flowchart showing the second algorithm for the wire breaking detection according to the embodiment.

A second algorithm for the wire breaking detection at the temperature detection circuit 26 will describe concretely with a flowchart showing FIGS. 6a and 6b. In the first algorithm shown referring FIGS. 5a and 5b, current quantity that is applied to the motor M is measured at every one second, measured current quantities at passed ten times are averaged, and it is judged that the averaged current quantity is or not larger than predetermined quantities and longer than predetermined times continuously. Compared with the first algorithm, in the second algorithm shown referring FIGS. 6a and 6b, it is judged that an averaged current quantity during 120 seconds or 60 seconds is or not larger than predetermined current quantities.

First, it is judged that a value of a one-second-counter is or not one in step 112. When a judgement in step 112 in "No," namely the value of the one-second-counter is not equal one, the process is finished. One the other hand, when the judgement in step 112 is "Yes," namely the value of the one-second-counter is equal one, the one-second-counter is reset in step 114. These processes mean that below steps are proceeded at every one second. Next, current quantity i that is applied to the motor M is measured by the current measuring device 32 in step 116. A measured current quantity is memorized to the temperature detection circuit 26, and a current quantity measured at N+1 times ago (in this embodiment, N is equal 120) and memorizing to the temperature detection circuit 26 is deleted in step 118. This means the temperature detection circuit 26 memorizes current quantities measured during last 120 seconds. Consecutively, it is judged that a value of a ten-seconds-counter is or not in step 124. When a judgement in step 124 is "No," namely the value of the ten-seconds-counter is not equal one, the process is finished. One the other hand, when the judgement in step 124 is "No," namely the value of the ten-seconds-counter is equal one, the ten-seconds-counter is reset in step 126. These processes mean that the below steps are proceeded at every ten seconds. An averaged current quantity Iav1, which is average of measured current quantity at last N (=120) times, is calculated in step 128, and it is judged that the averaged current quantity Iav1 is or not larger than a first predetermined current quantity I1 (in this embodiment, 35A) in step 30. When a judgement in step 130 is "Yes," namely the averaged current quantity Iav1 is larger than the first predetermined current quantity I1 (=35A), a temperature TMPm of the motor M that is measured by the temperature sensor 40 is input to the temperature detection circuit 26 in step 152. And it is judged that input temperature TMPm is or not higher than a predetermined temperature TMPs (for example 25° C.) in step 154, When a judgement in step 154 is "No," namely input temperature TMPm is equal or lower than the predetermined temperature TMPs, it is decided that the wire of the thermistor 42 breaks. And a warning lamp is turned on in step 156. On the other hand, when the judgement in above described step 130 is "No," namely the averaged current quantity Iav is equal or lower than the first predetermined current quantity I1 (=35A), in step 148 another averaged current quantity Iav2, which is averaged of measured current quantity at last P times (in this embodiment, P is equal 60). And it is judged that the averaged current quantity Iav2 is or not larger than a second predetermined current quantity I2 (in this embodiment, 45A) in step 150. When a judgement in step 150 is "No," namely the averaged current quantity Iav2 is equal or smaller than the second predetermined current quantity I2 (=45A), the process is finished. When the judgement in step 150 is "Yes," namely the averaged current quantity I2 is larger than the second predetermined current quantity I2 (=45A), the process is forwarded to step 152 and blow steps are proceed as above described.

Compared with the above described second algorithm, the above described first algorithm has advantages that a calculation load for the temperature detection circuit 26 is less and a memory capacity of the temperature detection circuit 26 can be decreased. On the other hand, the second algorithm has advantages that the wire breaking can be detected even if current quantity decreases passingly smaller than the predetermined current quantity during the predetermined time.

Further, the other algorithm, which is combined the first algorithm with the second algorithm, is adapted. That is, a judgement related to the aforementioned first pair P1 of predetermined current quantity I1 (=35A) and time T1 (=120 seconds) is operated according to the first algorithm, another judgement related to the aforementioned second pair P2 of predetermined current quantity I2 (=45A) and time T2 (=60 seconds) is operated according to the second algorithm. In this algorithm, both of advantageous, which are decreasing the calculation load and can being detected even if current quantity decreases passingly, can be obtained.

The temperature sensor that measures temperature of the motor of the electric power steering apparatus is described in above embodiment, however the present invention is applicable to other kinds of motor or other kinds of electric driven device such as a solenoid valve.

Obviously, numerous modifications and variations of the present invention are possible in light of the above teachings. It is therefore to be understood that within the scope of the appended claims, the present invention may be practiced otherwise than as specifically described herein.

What is claimed is:

1. A wire breaking detection method for a temperature sensor, which measures temperature of an electric driven device according to a variation of a resistance thereof, comprising:

judging whether a predetermined quantity of current is applied to said electric driven device during a predetermined time;

comparing a measured temperature that is measured by said temperature sensor with a predetermined temperature when said predetermined quantity of current is applied to the electric driven device during said predetermined time; and deciding a wire breaking of said temperature sensor when said measured temperature is lower than said predetermined temperature.

2. A wire breaking detection method for a temperature sensor according to claim 1, wherein:

whether a state that an average of quantity of the current applied to said electric driven device is larger than said predetermined quantity of current continues longer than said predetermined time is judged.

3. A wire breaking detection method for a temperature sensor according to claim 1, wherein:

whether an average of quantity of the current that is applied to said electric driven device during said predetermined time is larger than said predetermined quantity of current is judged.

4. A wire breaking detection method for a temperature sensor according to claim 1, wherein:

a combination of said predetermined quantity of current and said predetermined time is set up as temperature of said electric driven device can rise higher than said predetermined temperature when said predetermined quantity of current is applied to said electric device during said predetermined time even in low temperature.

5. A wire breaking detection method for a temperature sensor according to claim 1, wherein:

a combination of said predetermined quantity of current and said predetermined time is set up as performance of said electric driven device dose not deteriorate when said predetermined quantity of current is applied to said electric device during said predetermined time.

6. A wire breaking detection method for a temperature sensor according to claim 1, wherein:

a combination of said predetermined quantity of current and said predetermined time is set up as temperature of said electric driven device can rise higher than said predetermined temperature even in low temperature, and performance of said electric driven device dose not deteriorate, when said predetermined quantity of current is applied to said electric device during said predetermined time.

7. A wire breaking detection method for a temperature sensor according to claim 1, wherein:

a first pair of combination that is a first predetermined quantity of current and a first predetermined time and a second pair of combination that is a second predetermined quantity of current and a second predetermined time are set up, and at least one of said combinations is judged; and said first quantity of current is larger than said second quantity of current, and said first time is shorter than said second time.

8. A temperature sensing apparatus for measuring temperature of an electric driven device comprising:

a temperature sensor outputting equivalents of resistance of a thermal resistor that is contained therein and disposed near said electric driven device;

a current measuring device measuring quantity of current that is applied to said electric driven device; and a temperature detection circuit detecting temperature of said electric driven device according to said output equivalents from said temperature sensor; wherein said temperature detection circuit judges whether a predetermined quantity of current is applied to said electric driven device during a predetermined time according to quantity of current measured by said current measuring device, compares temperature detected by said temperature detection circuit with a predetermined temperature when said predetermined quantity of current is applied to the electric driven device during said predetermined time, and decides a wire breaking of said thermal resistor when said detected temperature is lower than said predetermined temperature.

9. A temperature sensing apparatus for measuring temperature of an electric driven device according to claim 8, wherein:

whether a state that an average of quantity of the current measured by said current measuring device is larger than said predetermined quantity of current continues longer than said predetermined time is judged.

10. A temperature sensing apparatus for measuring temperature of an electric driven device according to claim 8, wherein:

whether an average of quantity of the current measured by said current measuring device during said predetermined time is larger than said predetermined quantity of current is judged.

11. A temperature sensing apparatus for measuring temperature of an electric driven device according to claim 8, wherein:

a combination of said predetermined quantity of current and said predetermined time is set up as temperature of said electric driven device can rise higher than said predetermined temperature when said predetermined quantity of current is applied to said electric device during said predetermined time even in low temperature.

12. A temperature sensing apparatus for measuring temperature of an electric driven device according to claim 8, wherein:

a combination of said predetermined quantity of current and said predetermined time is set up as performance of said electric driven device dose not deteriorate when said predetermined quantity of current is applied to said electric device during said predetermined time.

13. A temperature sensing apparatus for measuring temperature of an electric driven device according to claim 8, wherein:

a combination of said predetermined quantity of current and said predetermined time is set up as temperature of said electric driven device can rise higher than said predetermined temperature even in low temperature, and performance of said electric driven device dose not deteriorate, when said predetermined quantity of current is applied to said electric device during said predetermined time.

14. A temperature sensing apparatus for measuring temperature of an electric driven device according to claim 8, wherein:

a first pair of combination that is a first predetermined quantity of current and a first predetermined time and a second pair of combination that is a second predetermined quantity of current and a second predetermined time are set up, and at least one of said combinations is judged; and said first quantity of current is larger than said second quantity of current, and said first time is shorter than said second time.

15. A temperature sensing apparatus for measuring temperature of an electric driven device according to claim 8, wherein:

said equivalents of resistance are voltages that acts to said thermal resistor.

16. A temperature sensing apparatus for measuring temperature of an electric driven device comprising:

a temperature sensing means for outputting equivalents of resistance of a thermal resistor that is contained therein and disposed near said electric driven device;

a current measuring means for measuring quantity of current that is applied to said electric driven device; and a temperature detection means for detecting temperature of said electric driven device according to said output equivalents from said temperature sensing means; wherein said temperature detection means judges whether a predetermined quantity of current is applied to said electric driven device during a predetermined time according to quantity of current measured by said current measuring means, compares temperature detected by said temperature detection means when said predetermined quantity of current is applied to the electric driven device during said predetermined time with a predetermined temperature, and decides a wire breaking of said thermal resistor when said detected temperature is lower than said predetermined temperature.

\* \* \* \* \*